United States Patent [19]

Mysicka et al.

[11] 4,331,067
[45] May 25, 1982

[54] COFFEEMAKER

[75] Inventors: James C. Mysicka, Berwyn; Ralph C. Stern, LaGrange Park; Robert J. Augustine, Downers Grove, all of Ill.

[73] Assignee: Sunbeam Corporation, Chicago, Ill.

[21] Appl. No.: 219,191

[22] Filed: Dec. 22, 1980

[51] Int. Cl.³ .............................................. A47J 31/00
[52] U.S. Cl. ...................................... 99/305; 99/285; 99/295
[58] Field of Search ................. 99/295, 305, 306, 307, 99/315, 313, 314, 316, 317, 280, 281, 282, 283, 285

[56] References Cited

U.S. PATENT DOCUMENTS

| | | | |
|---|---|---|---|
| 2,835,188 | 12/1958 | Graham | 99/299 |
| 3,040,648 | 4/1959 | Vieceli | 99/311 |
| 3,333,527 | 8/1967 | Bender | 99/283 |
| 3,333,528 | 8/1967 | Bender | 99/299 |
| 3,333,964 | 8/1967 | Bender | 99/71 |
| 3,908,530 | 9/1975 | Simon, Jr. et al. | 99/307 |
| 3,972,273 | 8/1976 | Carlson | 99/305 |
| 4,056,050 | 11/1977 | Brown | 99/305 |
| 4,064,795 | 12/1977 | Ackerman | 99/304 |
| 4,070,956 | 7/1976 | Brown | 99/304 |
| 4,108,053 | 8/1978 | Vink | 99/306 |
| 4,191,100 | 3/1980 | Marotta | 99/299 |
| 4,266,471 | 5/1981 | Rosengren | 99/305 |

Primary Examiner—Robert W. Jenkins
Attorney, Agent, or Firm—George R. Clark; Neil M. Rose; Allen J. Hoover

[57] ABSTRACT

A coffeemaker in which heated water infuses coffee grounds held in a basket, includes a spreader, which is associated with the basket, and which is adjustable so as to enable relative proportions of the water bypassing and not bypassing the grounds to be adjusted. None of the water bypasses the grounds at one selected position, for four dry measures of coffee grounds and four liquid measures of heated water, whereas a small portion of the water bypasses the grounds at another selected position, for more dry measures of coffee grounds and more liquid measures of heated water.

5 Claims, 13 Drawing Figures

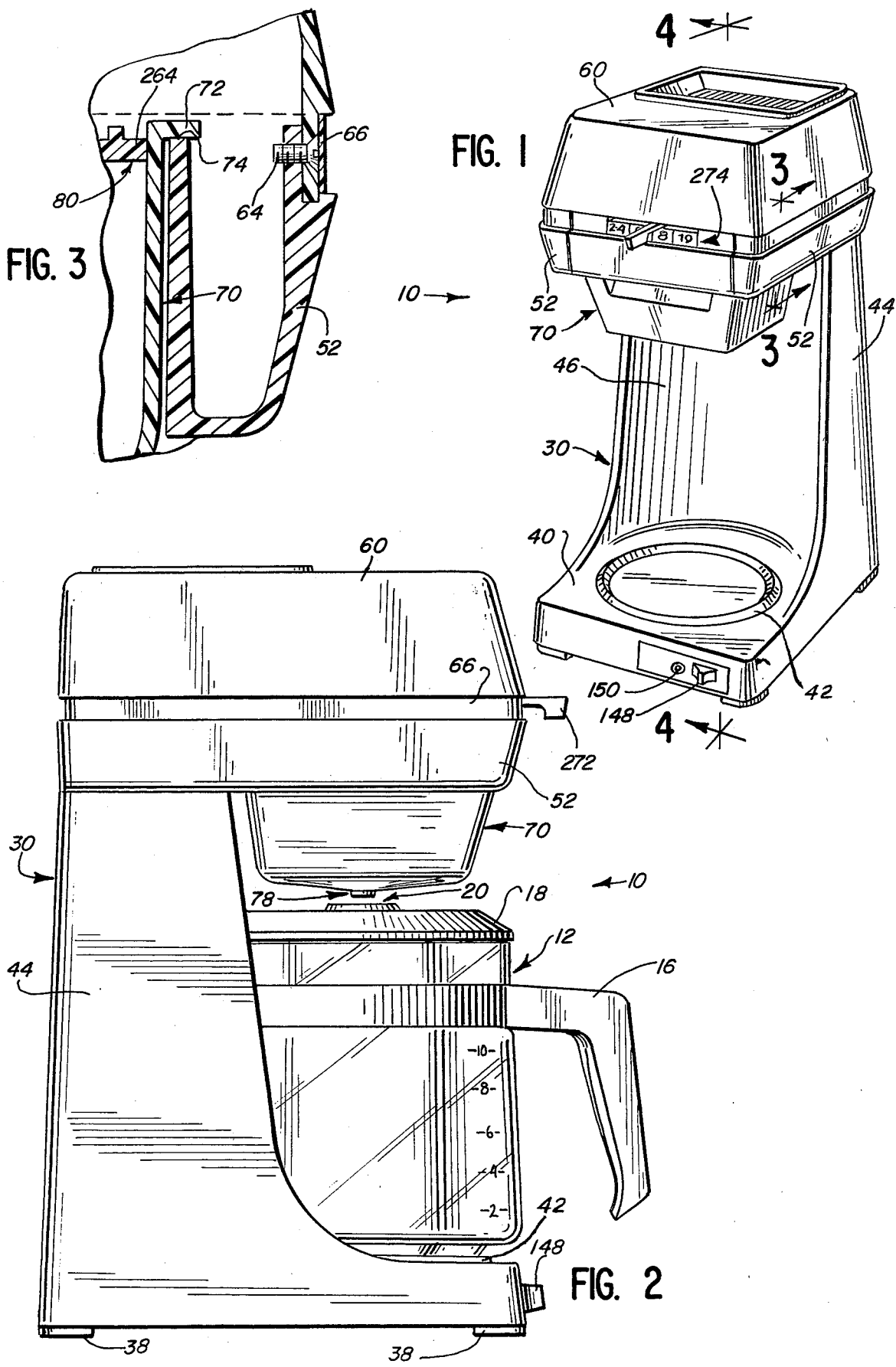

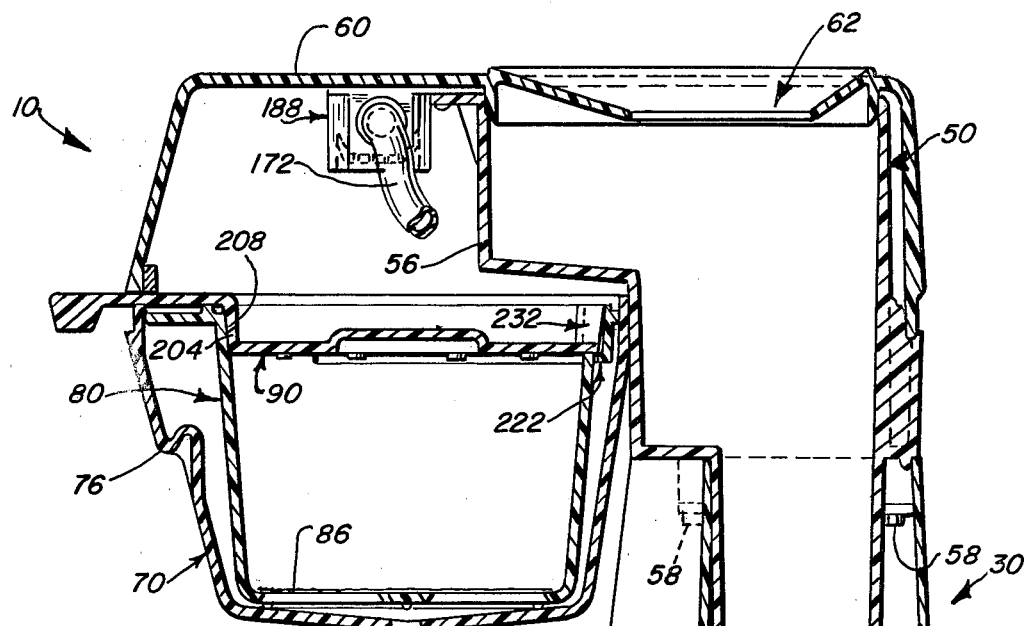
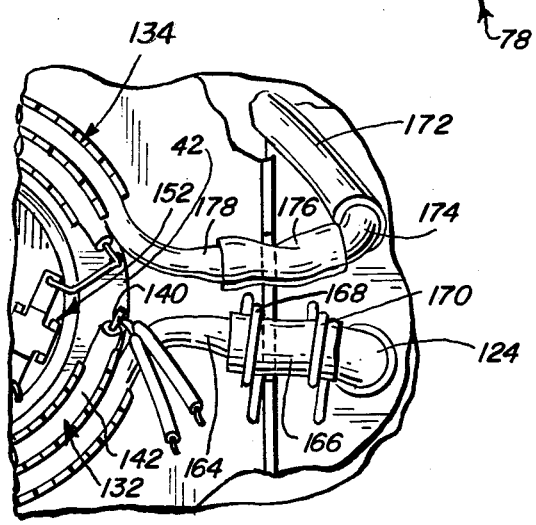
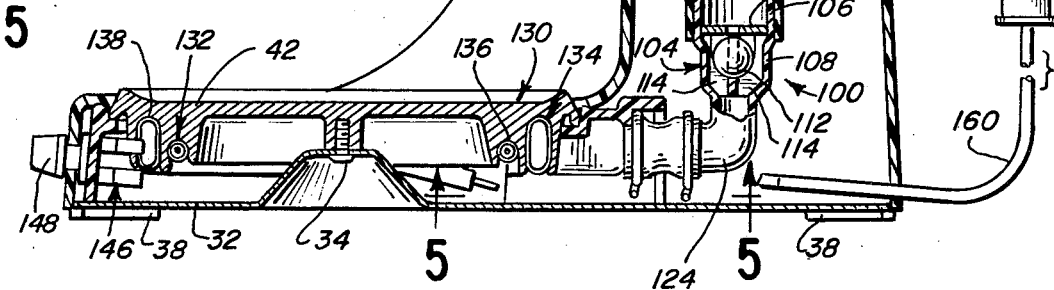
FIG. 4
FIG. 5

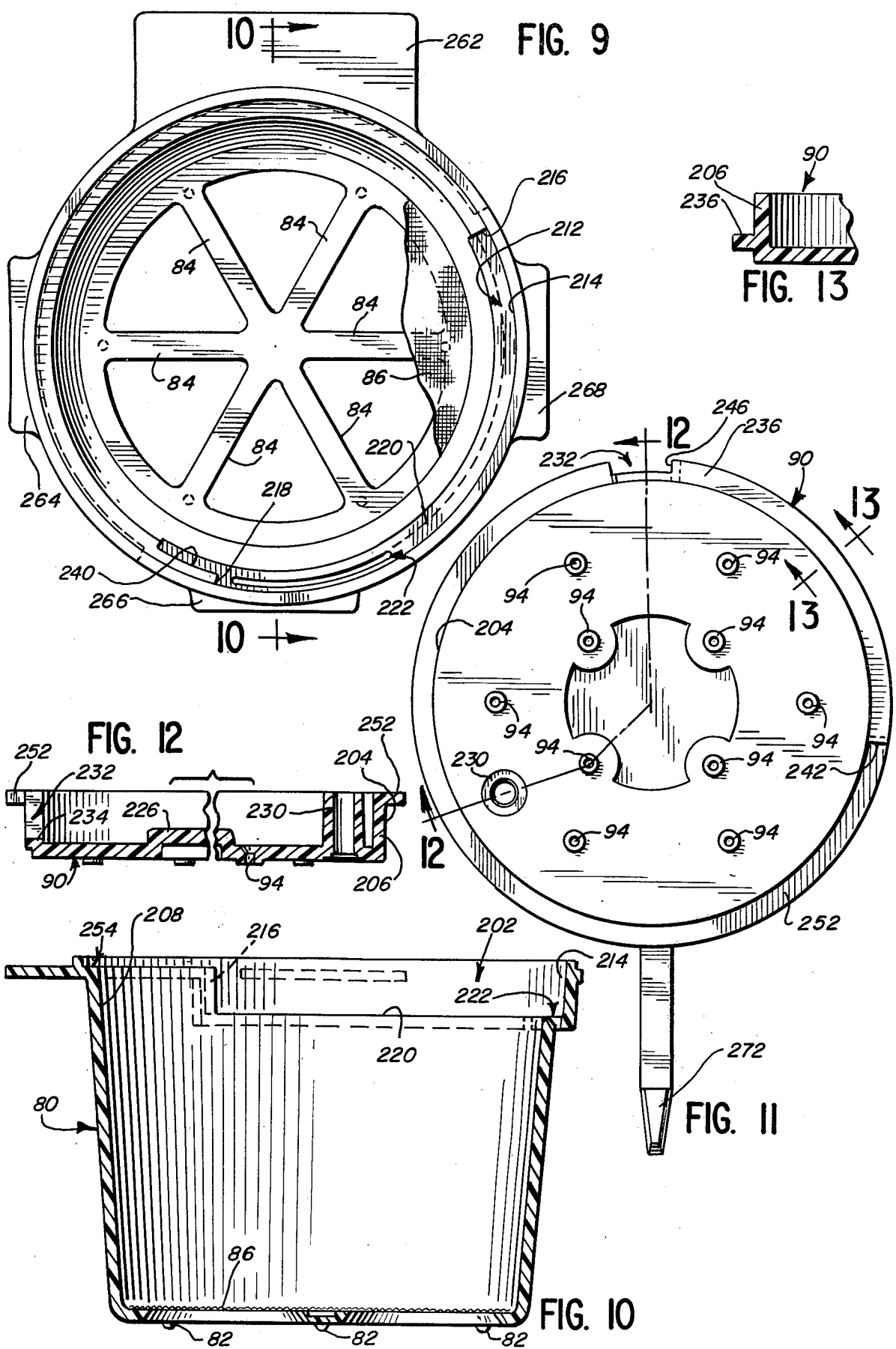

COFFEEMAKER

BACKGROUND OF THE INVENTION

This invention pertains to a coffeemaker of a type comprising a source, which is adapted to supply heated water, a basket, which is adapted to hold coffee grounds and to receive heated water from the source, so as to yield an infusion from the grounds as infused by heated water from the source, and which is adapted to filter the grounds from the infusion and to discharge the infusion, and a receptacle, which is adapted to receive the infusion being discharged from the basket.

Pertinent examples of various coffeemakers of the type noted above are disclosed in U.S. Pat. No. 3,908,530, U.S. Pat. No. 4,056,050, U.S. Pat. No. 4,064,795, U.S. Pat. No. 4,108,053, and U.S. Pat. No. 4,191,100. From such examples, it is known for a coffeemaker of the type noted above to be provided with a bypassing means, by which a portion of the water from the source may be caused to bypass the grounds. Also, the bypassing means may be adjustable, so as to enable relative proportions of the water bypassing and not bypassing the grounds to be adjusted.

Earlier examples of related interest include U.S. Pat. No. 2,835,188, U.S. Pat. No. 3,040,648, U.S. Pat. No. 3,333,527, U.S. Pat. No. 3,333,528, and U.S. Pat. No. 3,333,964.

For a coffeemaker of the type noted above, it is desirable from a standpoint of simplicity for a user desiring to make a batch of brewed coffee to be instructed to use a given number of dry measures of coffee of a suitable grind and to use the same number of liquid measures of water. Equivalently, the user may be instructed to use one dry measure of coffee of a suitable grind for each liquid measure of water. So-called "drip" grind may be specified.

Typically, the user is instructed to use more or less coffee according to his or her taste. Commonly, in the United States of America, dry measures of coffee are expressed in "tablespoons" of a capacity of one-sixteenth of a standard cup per "tablespoon", or in some other term used in cooking, and liquid measures of water are expressed in "cups" of a capacity of five fluid ounces per "cup".

However, in a coffeemaker of the type noted above, if different batches of brewed coffee are made, one batch using a given smaller number of dry measures of coffee of a suitable grind, as infused by the same smaller number of liquid measures of water, and another batch using a given larger number of dry measures of coffee of the same grind, as infused by the same larger number of liquid measures of water, do not exhibit consistent strengths. The batch using the given larger number of dry measures of coffee, as infused by the same larger number of liquid measures of water, is stronger than the batch using the given smaller number of dry measures of coffee, as infused by the same smaller number of liquid measures of water.

The strength of a batch of brewed coffee can be measured by various objective tests. A preferred test employs a standard sample, which may be 10 milliliters drawn from the batch, and which is dried on a dish of known tare weight in an oven until a dry residue remains. The dry residue is weighed. For precise measurements, suitable controls of times, temperatures, and humidities are employed.

It is known that, in a coffeemaker of the type noted above, a portion of the water infusing the grounds is retained by the grounds.

Accordingly, this invention is addressed to an improvement in a coffeemaker of the type noted above, whereby brewed coffee or more consistent strength can be made from one batch to another batch, although a given number of dry measures of coffee of a suitable grind and an equal number of liquid measures of water are used for one batch, and although a different number of dry measures of coffee of the same grind and an equal number of liquid measures of water are used for another batch.

SUMMARY OF THE INVENTION

The improvement of this invention may be embodied in a coffeemaker of a type comprising a source, a basket, a spreader, and a receptacle, as described below.

The source is adapted to supply a measured quantity of heated water. The basket is adapted to hold a measured quantity of coffee grounds and to receive heated water from the source, so as to yield an infusion from the grounds as infused by heated water from the source. The basket is adapted to filter the grounds from the infusion and to discharge the infusion. The spreader covers the basket, so as to be interposed between the source and the grounds held by the basket. The source is perforated, so as to pass heated water from the source over the grounds. The receptacle is adapted to receive the infusion being discharged from the basket.

In the improvement of this invention, the spreader fits into an upper portion of the basket, so as to be disposed above the grounds held by the basket. Also, an outer wall of the spreader and an inner wall of the upper portion of the basket are curved about a vertical axis, so as to enable the spreader to be rotated about the vertical axis.

Further, the basket is provided with a peripheral shelf having an outer wall, opposite end walls, and an annular floor, which has an arcuate slot opening outside the basket and extending over a portion of the annular floor near one end wall of the peripheral shelf. Also, the spreader is dished, so as to receive the water from the source.

Further, the spreader has a peripheral aperture opening onto the peripheral self, and the spreader has an integral lip overlying the annular floor of the peripheral shelf and being movable arcuately as the spreader is rotated, so as to cover the arcuate slot completely when the spreader is rotated to one selected position, so as to uncover the slot completely when the spreader is rotated to another selected position, and so as to uncover the arcuate slot partially when the spreader is rotated to intermediate selected positions.

Further, the spreader has integral radial stops located at respective opposite ends of the integral lip and adapted to engage respective end walls of the peripheral shelf, so as to limit rotation of the spreader to a range including said selected positions. Also, the spreader is provided with a radial arm adapted to be manipulated, so as to enable the spreader to be adjusted among said selected positions.

Thereby, a portion of the water from the source bypasses the grounds when the spreader is adjusted to any selected position where the integral lip does not cover the arcuate slot completely. Also, relative portions of the water bypassing and not bypassing the grounds can be adjusted.

Preferably, the coffeemaker comprises a funnel, which encloses the basket laterally, which is interposed between the basket and the receptacle, and which is adapted to receive, combine, and funnel the infusion being discharged from the basket and the water bypassing the basket. Preferably, the funnel bears a visual scale, along which the radial arm is movable, and which indicates the selected position of the spreader. Preferably, the spreader has a weir, over which the water received by the spreader must rise to pass through the peripheral aperture, whereby some water received by the spreader passes through the spreader to the grounds before any water received by the spreader bypasses the grounds. Preferably, the spreader has an elevated portion, onto which the water received by the spreader falls, and which is not perforated.

BRIEF DESCRIPTION OF THE DRAWINGS

FIG. 1 is a perspective view of a coffeemaker embodying this invention.

FIG. 2 is an enlarged, lateral, elevational view of the coffeemaker. A carafe, which has a cover, is ommited in FIG. 1 but shown in FIG. 2.

FIG. 3 is an enlarged, fragmentary, sectional view, as taken along line 3—3 of FIG. 1, in a direction indicated by arrows.

FIG. 4 is an enlarged, vertical, sectional view, as taken along line 4—4 of FIG. 1, in a direction indicated by arrows.

FIG. 5 is an enlarged, fragmentary, sectional view, as taken along line 5—5 of FIG. 4, in a direction indicated by arrows.

FIG. 9 is a similar view of the basket, without the spreader, on a further enlarged scale.

FIG. 10 is a sectional view of the basket, as taken along line 10—10 of FIG. 9, in a direction indicated by arrows.

FIG. 11 is a bottom, plan view of the spreader, on the scale of FIGS. 9 and 10.

FIG. 12 is a vertical, sectional view of the spreader, as taken along line 12—12 of FIG. 9, in a direction indicated by arrows.

FIG. 13 is a fragmentary, sectional view, as taken along line 13—13 of FIG. 11, in a direction indicated by arrows.

DETAILED DESCRIPTION OF PREFERRED EMBODIMENT

Figure 6:
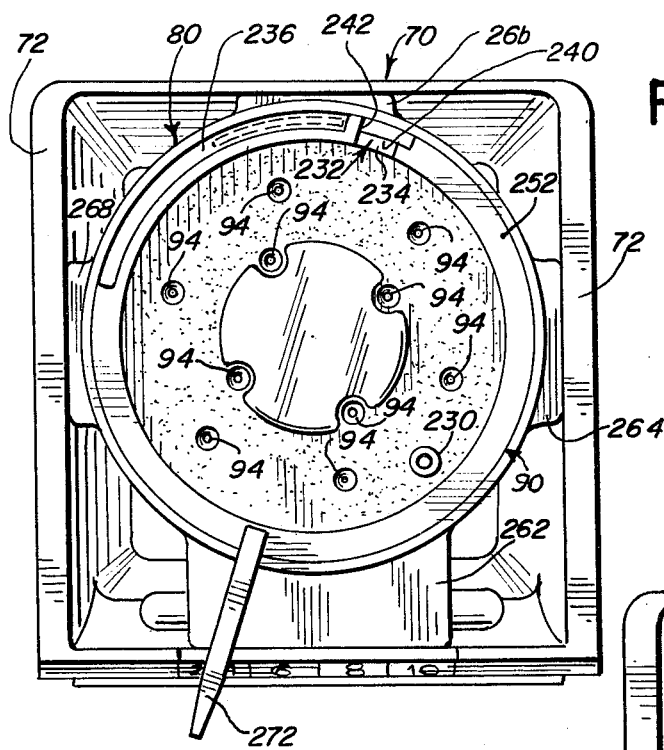
FIGS. 6, 7, and 8 are respective top, plan views of a basket and a spreader, as combined in the coffeemaker, on an enlarged scale. The spreader is shown in three different positions relative to the basket.

A coffeemaker 10 constituting a preferred embodiment of this invention is shown in the drawings. The coffeemaker 10 employs a carafe 12 of a conventional type being made of heat-resistant glass and having an attached handle 16 and a removable cover 18, which has a central inlet 20 enabling the carafe 12 to recive brewed coffee from the coffeemaker 10 while the carafe 12 remains covered (except for the central inlet 20) so as to reduce evaporative losses. The carafe 12 is provided with graduated markings enabling the carafe 12 to be used to measure a measured quantity of water to be heated in the coffeemaker 10.

The coffeemaker 10 comprises a hollow stand 30, which is made of suitable molded plastic. A bottom plate 32, which is made of stamped, aluminized steel, is fastened to the stand 30 by conventional screws 34, one of which is shown in FIG. 3. The stand 30 has integral feet 38, which enable the stand 30 to repose on a horizontal surface, a broad portion 40, which supports a warming plate 42 described below, and a columnar portion 44, which extends upwardly behind the warming plate 42. The columnar portion 44 has a curved surface 46, which accommodates the carafe 12 when the carafe 12 is placed on the warming plate 42.

The coffeemaker 10 comprises an open-topped tank 50, which may be made of similar molded plastic, and which is formed with elongated, integral portions 52 extending forwardly over the broad portion 40 of the stand 30 on opposite sides, a lower portion 54 extending downwardly into the columnar portion 44 of the stand 30, and an upper portion 56 reposing above the columnar portion 44 of the stand 30. The tank 50 is fastened by conventional screws 58, two of which are shown in FIG. 3, to the columnar portion 44 of the stand 30.

The coffeemaker 10 comprises a cover 60, which covers the tank 50, except for a slotted portion 62 being provided in the cover 60 and enabling water to be poured through the slotted portion 62 into the tank 50. The slotted portion 62 may be covered by a flap (not shown) hinged to the cover 60 and adapted to be lifted manually when unheated water is to be poured through the slotted portion 62. The cover 60 is fastened by conventional screws 64, one of which is shown in FIG. 3, to the integral portions 52 and other integral portions of the tank 50. The screws 64 are concealed by decorative tape 66.

The coffeemaker 10 comprises an open-topped, box-like funnel 70, which has integral lateral flanges 72 cooperating with respective supporting surfaces 74 of the integral portions 52 of the tank 50, so as to enable the funnel 70 to be inserted manually beneath a front portion of the cover 60 and to be withdrawn manually, in a manner suggesting manipulation of a drawer. The funnel 70 is formed with an overhanging portion 76, which facilitates insertion and withdrawal of the funnel 70, and with a lower, central outlet 78.

The coffeemaker 10 comprises a basket 80, which fits into the funnel 70, and which is adapted to hold a measured quantity of coffee grounds. Integral feet 82 on the basket 80 allow liquid bypassing the basket 80 to flow beneath the basket 80 to the lower, central outlet 78 of the funnel 70. The basket 80 is imperforate, except for lower supporting spokes 84, which are covered by a screening cloth 86 of a conventional type being fastened in the basket 80 in a conventional manner (as in molding of the basket 80) and having a mesh suitable to retain coffee grounds held in the basket 80 but to pass an infusion from such grounds as infused by heated water. The screening cloth 86 is shown fragmentarily in FIG. 9. The infusion passes through the screening cloth 86 into the funnel 70, in which the infusion is combined with any water bypassing the grounds held by the basket 80 as discussed below, and through the lower, central outlet 78 of the funnel 70 into the carafe 12 placed on the warming plate 42, while the screening cloth 86 retains the grounds in the basket 80.

The coffeemaker 10 comprises an open-topped, cylindrical spreader 90, which fits onto the basket 80, so as to cover the grounds held in the basket 80. The spreader 90 is perforated by multiple small openings 94, so as to allow water supplied onto the spreader 90 to pass through the small openings 94 onto the grounds held by the basket 80. An exemplary one of the openings 94 appears in cross-section in FIG. 12.

The coffeemaker 10 comprises a check valve 100, which is mounted beneath the tank 50, so as to communicate with a lower outlet 102 of the tank 50. The check valve 100 is adapted to allow water to flow downwardly from the lower outlet 102 but not to allow water to flow upwardly to the lower outlet 102. The check valve 100 comprises a tubular member 104, which has an inlet portion 106 of larger inner diameter and an outlet portion 108 of smaller inner diameter. The check valve 100 comprises an annular seat 110, which is fixed suitably within the inlet portion 106, and a ball 112, which is fitted loosely within the outlet portion 108, so as to permit water to flow downwardly, which is retained by plural integral ribs 114 formed integrally in the outlet portion 108, and which is adapted to be moved upwardly against the annular seat 110, so as not to allow water to flow upwardly. A rubber tube 120 is stretched to fit at its opposite ends over a tubular portion 122 of the tank 50, at the lower outlet 102 of the tank 50, and over the inlet portion 106 of the check valve 100, so as to connect the check valve 100 to the tank 50. The check valve 100 has a curved, tubular extension 124, which is shaped like an elbow, and which extends from the outlet portion 108.

The coffeemaker 10 comprises a conventional, flow-through heater 130, which includes the warming plate 42, a heating element 132 of a conventional type, and a conduit 134 of deformable tubular aluminum. The warming plate 42 is cast of aluminum, so as to have an inner annular channel 136 opening downwardly and receiving the heating element 132, which is secured by staking in a conventional manner, as shown in FIG. 5, and so as to have an outer annular channel 138 opening downwardly and receiving the conduit 134, which also is secured by staking, as shown in FIG. 5.

The heating element 132 includes an inner conductor 140 of high resistivity, an outer sheath 142 of deformable tubular aluminum, and packed magnesium oxide (or equivalent material) between the inner conductor 140 and the outer sheath 142. Opposite ends of the heating element 132 emerge from the inner annular channel 136 of the warming plate 42 through a cut-away portion of the warming plate 42, as shown in FIG. 5. The inner conductor 140 is connected in a conventional electrical circuit comprising an on-off switch 146, which is adapted to be actuated manually via an external member 148, a small running lamp 150, which indicates when lit that the on-off switch 146 is closed, and a conventional thermostatic control 152, which is shown fragmentarily in FIG. 5, which is mounted suitably beneath the warming plate 42, and which controls electrical energization of the inner conductor 140 in a cyclic manner depending upon a temperature sensed by the conventional thermostatic control 152. The aforesaid electrical circuit is energized through a conventional electrical cord 160 terminating in a conventional electrical plug 162.

An inlet end 164 of the conduit 134 emerges from the outer annular channel 138 of the warming plate 42 through the cut-away portion of the warming plate 42, as shown in FIG. 5, and is connected via a rubber tube 166 to the extension 124 of the check valve 100. The rubber tube 166 is secured to the inlet end of the conduit 134 by a conventional clamp 168. The rubber tube 166 is stretched to fit over the extension 124 of the check valve 100 and is secured by a similar clamp 170. An elongated, rubber tube 172, which is shown fragmentarily in FIGS. 4 and 5, is stretched to fit at its lower end over an outlet end of an elbow 174 of tubular cross-section and is deployed through the columnar portion 44 of the stand 30. A rubber tube 176 is stretched to fit at its one end over an inlet end of the elbow 174 and at its other end over an outlet end 178 of the conduit 134. The outlet end 178 of the conduit 134 also emerges from the cut-away portion of the warming plate 42. At its upper end, the elongated, rubber tube 172 is stretched to fit over a tubular inlet of a dispensing head 188, which is mounted within the front portion of the cover 60, so as to be adapted to dispense heated water onto the spreader 90. The dispensing head 188 may be heat-staked to the tank 50.

Accordingly, if the aforesaid electrical circuit is energized, and if the on-off switch 146 is closed, a measured quantity of unheated water poured into the tank 50 flows through the check valve 100 and through the conduit 134, in which the water is heated via thermal conduction from the heating element 132 through the warming plate 42. As heated in the conduit 134, the water expands and boils to some extent, whereupon it cannot return to the tank 50 because of the check valve 100, and whereupon the water thus is pumped upwardly through the elongated, rubber tube 172 to the dispensing head 188, which dispenses the water onto the spreader 90. The water supplied onto the spreader 90 passes through the openings 94 of the spreader 90 to the grounds held by the basket 80, in which the water infuses the grounds, so as to form an infusion, from which the grounds are filtered by the screening cloth 86 as the infusion passes into the funnel 70.

As described above, the coffeemaker 10 is somewhat similar to prior coffeemakers. Novel features of the coffeemaker 10 are described below.

The spreader 90 fits into an upper portion 202 of the basket 80, and an outer surface 204 of a cylindrical rim 206 of the spreader 90 and an inner surface 208 of the upper portion 202 of the basket 80 are curved about a vertical axis, so as to enable the spreader 90 to be rotated about the vertical axis. The upper portion 202 of the basket 80 is formed with a peripheral shelf 212 having an outer wall 214, an end wall 216, an end wall 218 opposite the end wall 216, and an annular floor 220, which has an arcuate slot 222 opening outside the basket 80 and extending over a portion of the annular floor 220 near the end wall 218.

The spreader 90 is dished, so as to confine the water from the dispensing head 188. The spreader 90 has an elevated, unperforated portion 226, onto which the water received by the spreader 90 tends to fall. The spreader 90 is formed with a tubular vent 230, which extends vertically to a level equal to the level of the cylindrical rim 206, so as to vent the basket 80 even if the level of the water on the spreader 90 approaches the level of the cylindrical rim 206.

In the cylindrical rim 206, the spreader 90 has a peripheral aperture 232 opening onto the peripheral shelf 212, and a weir 234, over which the water received by the spreader 90 must rise to pass through the peripheral aperture 232. The spreader 90 has an integral lip 236 extending outwardly from the cylindrical rim 206 over a minor portion of its circumferential extent, overlying the annular floor 220 of the peripheral shelf 212, and being movable arcuately as the spreader 90 is rotated, so as to cover the arcuate slot 222 completely when the spreader 90 is rotated to one selected position, so as to uncover the arcuate slot 222 completely when the spreader 90 is rotated to another selected position, and so as to uncover the arcuate slot 222 partially when the spreader 90 is rotated to intermediate selected positions. When the spreader 90 is rotated to the selected position wherein the integral lip 236 covers the arcuate slot 222 completely, the peripheral aperture 232 is blocked by a recessed surface 240 of the upper portion 202 of the basket 80, as shown in FIG. 6.

The spreader is formed integrally with a radial stop 242 located at a given end of the integral lip 236 and with a radial stop 246 located at the opposite end of the integral lip 236. The radial stop 242 is adapted to engage the end wall 216 of the peripheral shelf 212. The radial stop 246 is adapted to engage the end wall 218 of the peripheral shelf 212. Thus, the radial stop 242 and the radial stop 246 limit rotation of the spreader 90 to a range including the selected position wherein the integral lip 236 covers the arcuate slot 222 completely, the selected position wherein the integral lip 236 uncovers the arcuate slot 222 completely, and intermediate selected positions wherein the integral lip 236 uncovers the arcuate slot 222 partially.

The spreader 90 has another integral lip 252 extending outwardly from the cylindrical rim 206 over a major portion of its circumferential extent, between the radial stop 242 and the radial stop 246, and at a level above the level of the integral lip 236. The integral lip 252 fits into a peripheral notch 254, which is formed in the upper portion 202 of the basket 80 between the end walls 216, 218 of the peripheral shelf 212 but not where the peripheral shelf 212 is provided, so as to guide the spreader 90 as the spreader 90 is rotated.

The basket 80 is formed integrally with integral locating tabs 262, 264, 266, and 268, which fit closely within the funnel 70, so as to locate the basket 80 properly within the funnel 70. The locating tab 262, which is longer than the locating tabs 264, 266, and 268, fits closely within the overhanging portion 76 of the funnel 70, so as not to allow the basket 80 to fit properly within the funnel 70 except in one rotational orientation of the basket 80 within the funnel 70.

The spreader 90 is formed with a radial arm 272, which extends over the longer tab 262 when the spreader 90 is fitted properly into the basket 80, and which is adapted to be manipulated by a user of the coffeemaker 10, so as to enable the spreader 90 to be adjusted among the selected positions included in the range of rotation of the spreader 90. The overhanging portion 76 of the funnel 70 bears a visual scale 274, over which the radial arm 272 extends, and along which the radial arm 272 is movable, so as to indicate the selected position of the spreader 90. As shown, the visual scale 274 is marked "2-4", "6", "8", and "10", so as to indicate the selected positions for two to four "cups", six "cups", eight "cups", and ten "cups".

A portion of the water supplied by the dispensing head 188 bypasses the grounds when the spreader 90 is adjusted to any selected position wherein the integral lip 236 does not cover the arcuate slot 222 completely. As the spreader 90 is adjusted to a selected position, relative proportions of the water bypassing and not bypassing the grounds are adjusted.

The arcuate slot 222 throttles the water bypassing the grounds. The weir 234 causes some water received by the spreader 90 to pass through the holes 94 to the grounds before any water received by the spreader 90 bypasses the grounds, so as to provide that the grounds are wetted initially, and causes some water to spill over the weir 234. Whenever the arcuate slot 222 is not covered, the water spilled over the weir 234 bypasses the grounds.

The coffeemaker 10 yields brewed coffee of a given strength in the carafe 12 if four "tablespoons" of coffee grounds of a given grind are infused by four "cups" of heated water in the coffeemaker 10. Although less than four "cups" of water and less than four "tablespoons" of coffee grounds may be used in the coffeemaker 10, no adjustment of the spreader 90 is made for less than four "cups" of water and less than four "tablespoons" of coffee grounds.

The spreader 90 is adjustable so that approximately none of the water received by the spreader 90 bypasses the grounds when the spreader 90 is adjusted to one adjusted position, in which the spreader is shown in FIG. 6, which is indicated by "2-4" on the visual scale 274, and to which the spreader 90 is to be adjusted for the coffeemaker 10 to yield brewed coffee of the given strength in the carafe 12 if four "tablespoons" of coffee grounds of the given grind are held by the basket 80 and if four "cups" of heated water are supplied to the spreader 90.

Figure 8:
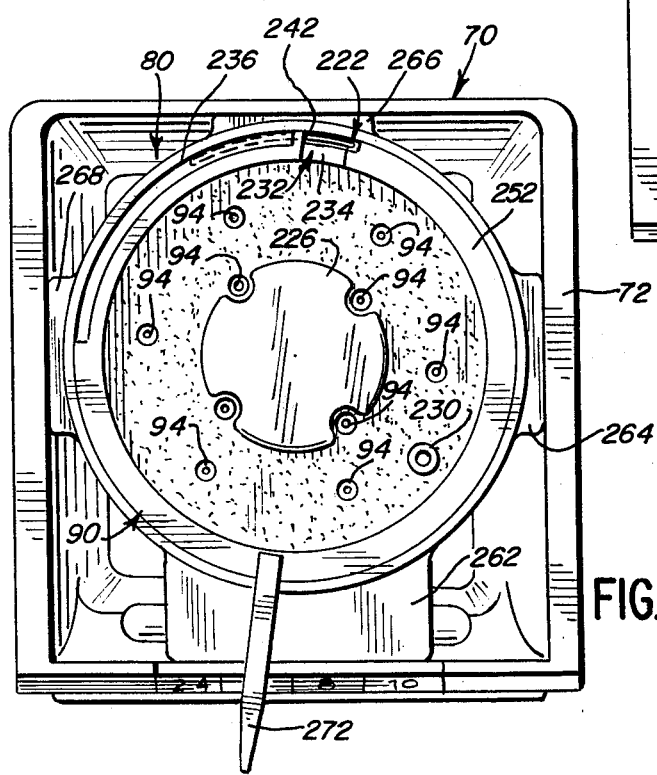

The spreader 90 is adjustable so that a small yet minor portion of the water received by the spreader 90 and not retained by the grounds bypasses the grounds when the spreader 90 is adjusted to another selected position, in which the spreader 90 is shown in FIG. 8, which is indicated by "6" on the visual scale 274, and to which the spreader 90 is to be adjusted for the coffeemaker 10 to yield brewed coffee of more consistent strength in the carafe 12 if six "tablespoons" of coffee grounds of the given grind are held by the basket 80 and if six "cups" of heated water are supplied to the spreader 90.

The spreader 90 is adjustable so that a larger yet minor portion of the water received by the spreader 90 and not retained by the grounds bypasses the grounds when the spreader 90 is adjusted to another selected position, in which the spreader 90 is shown in FIG. 1, which is indicated by "8" on the visual scale 274, and to which the spreader 90 is to be adjusted for the coffeemaker 10 to yield brewed coffee of more consistent strength in the carafe 12 if eight "tablespoons" of coffee grounds of the given grind are held by the basket 80 and if eight "cups" of heated water are supplied to the spreader 90.

Figure 7:
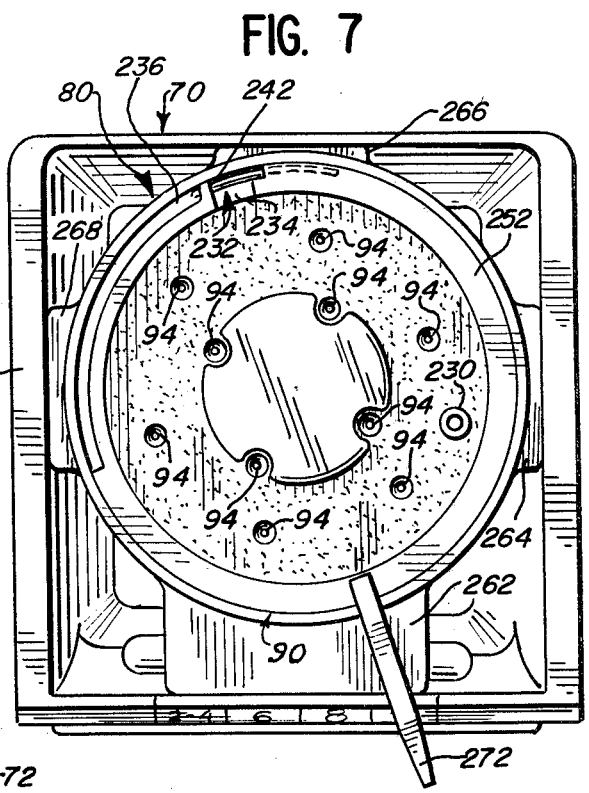

The spreader 90 is adjustable so that a larger yet minor portion of the water received by the spreader 90 and not retained by the grounds bypasses the grounds when the spreader 90 is adjusted to another selected position, in which the spreader 90 is shown in FIG. 7, which is indicated by "10" on the visual scale 274, and to which the spreader 90 is to be adjusted for the coffeemaker 10 to yield brewed coffee of more consistent strength in the carafe 12 if ten "tablespoons" of coffee grounds of the given grind are held by the basket 80 and if ten "cups" of heated water are supplied to the spreader 90.

More water bypasses the grounds when the spreader 90 is adjusted to the selected position indicated by "10" on the visual scale 274 than when the spreader 90 is adjusted to the selected position indicated by "8" on the visual scale 274. The visual scale 274 may be interpolated approximately for other desired adjustments of the spreader 90 between "2-4" and "10" on the visual scale 274.

As compared to prior coffeemakers, in which such adjustments cannot be made, the coffeemaker 10 yields brewed coffee or more consistent strength in the carafe 12 for a given number of "tablespoonfuls" of coffee grounds of a given grind held by the basket 80 and an equal number of "cups" of heated water supplied to the spreader 90, although the given number may range from four to ten. In these circumstances, approxmately one-tenth of the water supplied to the spreader 90 is retained by the grounds. Thus, the quantity of brewed coffee yielded by the coffeemaker 10 is approximately nine-tenths of the quantity of heated water supplied to the spreader 90. The water supplied to the tank 50 may be adjusted accordingly. Evaporative losses of the water in the coffeemaker 10 may be neglected.

I claim:
1. In a coffeemaker of a type comprising
   (a) a source, which is adapted to supply a measured quantity of heated water,
   (b) a basket, which is adapted to hold a measured quantity of coffee grounds and to receive heated water from the source, so as to yield an infusion from the grounds as infused by heated water from the source, and which is adapted to filter the grounds from the infusion and to discharge the infusion,
   (c) a spreader, which covers the basket, so as to be interposed between the source and the grounds held by the basket, and which is perforated, so as to pass heated water from the source over the grounds, and
   (d) a receptacle, which is adapted to receive the infusion being discharged from the basket, an improvement wherein the spreader fits into an upper portion of the basket, so as to be disposed above the grounds held by the basket, wherein an outer wall of the spreader and an inner wall of the upper portion of the basket are curved about a vertical axis, so as to enable the spreader to be rotated about the vertical axis, wherein the basket is provided with a peripheral shelf having an outer wall, opposite end walls, and an annular floor, which has an arcuate slot opening outside the basket and extending over a portion of the annular floor near one end wall of the peripheral shelf, wherein the spreader is dished, so as to receive the water from the source, wherein the spreader has a peripheral aperture opening onto the peripheral shelf, wherein the spreader has an integral lip overlying the annular floor of the peripheral shelf and being movable arcuately as the spreader is rotated, so as to cover the arcuate slot completely when the spreader is rotated to one selected position, so as to uncover the arcuate slot completely when the spreader is rotated to another selected position, and so as to uncover the arcuate slot partially when the spreader is rotated to intermediate selected positions, wherein the spreader has integral radial stops located at respective opposite ends of the integral lip and adaped to engage respective end walls of the peripheral shelf, so as to limit rotation of the spreader to a range including said selected positions, and wherein the spreader is provided with a radial arm adapted to be manipulated, so as to enable the spreader to be adjusted among said selected positions, whereby a portion of the water from the source bypasses the grounds when the spreader is adjusted to any selected position where the integral lip does not cover the arcuate slot completely, and whereby relative proportions of the water bypassing and not bypassing the grounds can be adjusted.

2. The improvement of claim 1 wherein the coffeemaker comprises
   (e) a funnel, which encloses the basket laterally, which is interposed between the basket and the receptacle, and which is adapted to receive, combine, and funnel the infusion being discharged from the basket and the water bypassing the basket.

3. The improvement of claim 2 wherein the funnel bears a visual scale, along which the radial arm is movable, and which indicates the selected position of the spreader.

4. The improvement of claim 2 or 3 wherein the spreader has a weir, over which the water received by the spreader must rise to pass through the peripheral aperture, whereby some water received by the spreader passes through the spreader to the grounds before any water received by the spreader bypasses the grounds.

5. The improvement of claim 4 wherein the spreader has an elevated portion, onto which the water received by the spreader falls, and which is not perforated.

* * * * *